Aug. 21, 1945.  F. W. EVERARD  2,383,051
INTERLOCKING TRANSFER BRIDGE OR CRANE
Filed Dec. 22, 1942  2 Sheets-Sheet 1
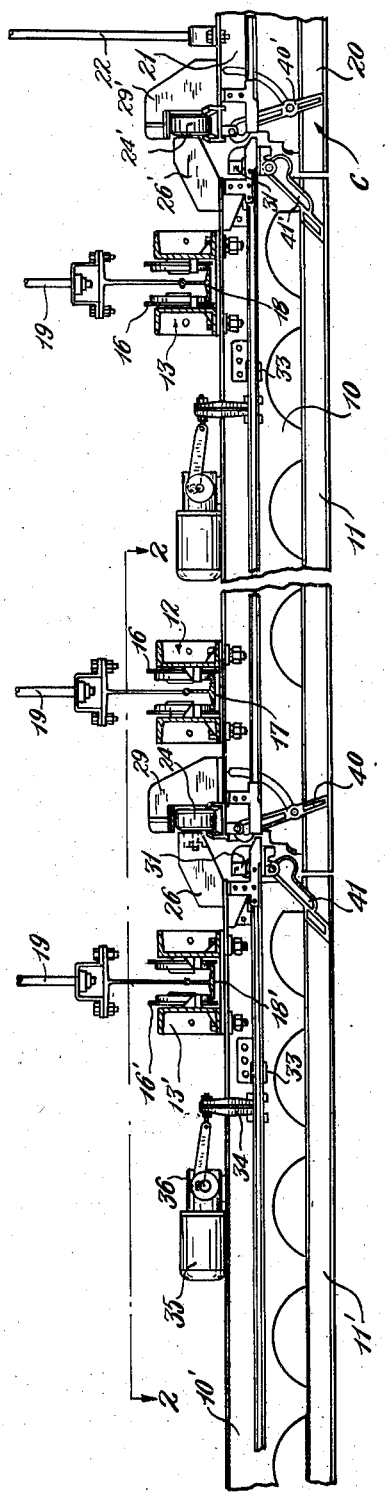
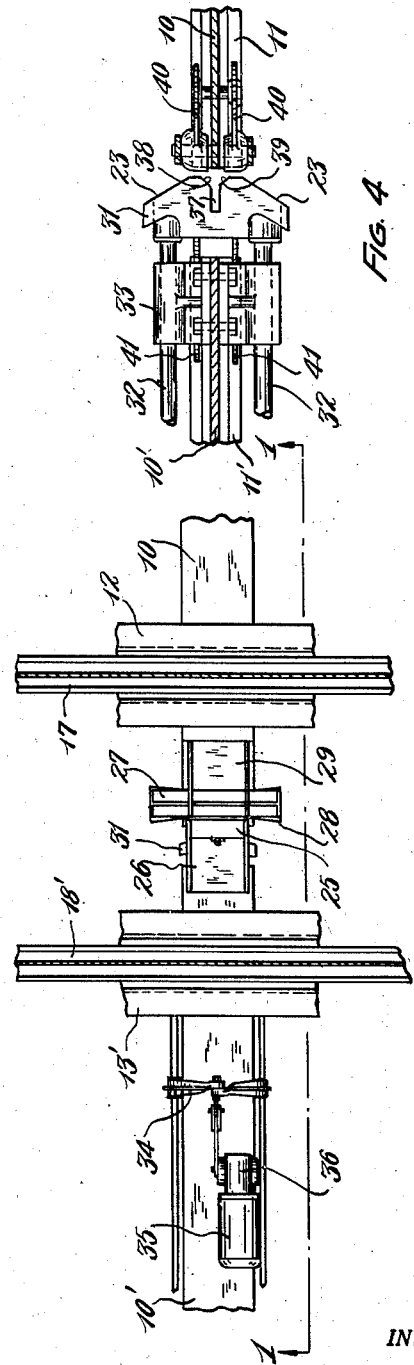
INVENTOR.
FREDERICK W. EVERARD
BY Kwis Hudson & Kent
ATTORNEYS

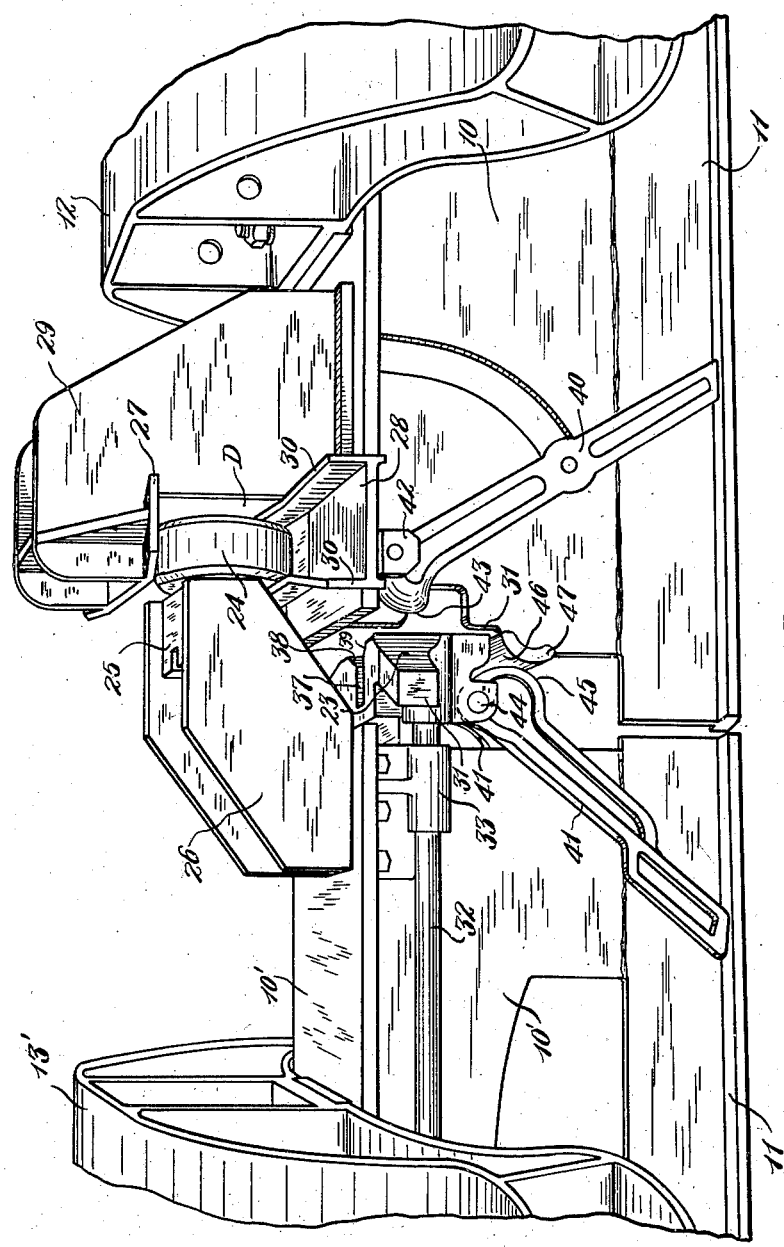

Patented Aug. 21, 1945

2,383,051

UNITED STATES PATENT OFFICE 2,383,051

INTERLOCKING TRANSFER BRIDGE OR CRANE

Frederick W. Everard, Wickliffe, Ohio, assignor to The Cleveland Crane & Engineering Company, Wickliffe, Ohio, a corporation of Ohio Application December 22, 1942, Serial No. 469,801

1 Claim. (Cl. 104—98)

The present invention relates to material handling overhead monorail underslung carrier systems comprising movable or traveling overhead transfer bridges or cranes for transferring carriers from one fixed track or part of the system to another, including the transferring of carriers directly from one transfer bridge or crane to another. More particularly, the invention relates to means for connecting or interlocking movable transfer bridges or cranes of a material handling system of the character referred to to each other and/or fixed tracks when positioned end to end in such a manner that the adjoining ends of adjacent rails align properly, thus facilitating the movement of a carrier from one bridge to another or from a transfer bridge to a spur track.

Material handling overhead monorail underslung carrier systems, including overhead transfer bridges or cranes for transferring carriers from one part of the system to another, are widely used in industrial plants, warehouses, etc. When heavy loads are handled by the carriers, as is generally the case, the carrier rail or rails deflect or move vertically because of building deflection, etc., as the carriers travel therealong. This is particularly true when the carrier rail is a part of a transfer bridge. The deflection or vertical movement of the carrier rails of transfer bridges, which occurs incident to the movement of loaded carriers onto and off the same, is due largely to the manner in which they are suspended.

Horizontal alignment of the carrier rails of transfer bridges with each other or with fixed tracks can be controlled by moving the transfer bridges along its supporting runway, but if the carrier rail or rails of a transfer bridge supporting a heavily loaded carrier are lower than the rail or rails of a spur track or of another transfer bridge onto which it is desired to move or run the carrier, because of deflection of the transfer bridge and its supporting structure incident to the weight of the carrier and load, the carrier cannot be moved onto the spur track or other transfer bridge without difficulty. The deflection or vertical disalignment of the carrier rails referred to cannot be readily compensated for in the usual suspension means employed, particularly in a two-way system, because of the great variation in the weight of the carriers and/or loads.

The principal object of the present invention is the provision of a novel and improved material handling overhead monorail underslung carrier system comprising a movable overhead transfer bridge or crane adapted to have the rail or rails thereof positioned in end to end relation to the rail or rails of a stationary spur track or a record transfer bridge so that carriers may be transferred, in either direction, directly from one transfer bridge to another or to a stationary spur track, and including means on the adjoining ends of adjacent carrier rails for properly aligning the same both horizontally and vertically so that carriers can be moved from a transfer bridge to a stationary spur track or from one transfer bridge directly to the other without difficulty.

Another object of the invention is the provision of a novel and improved material handling overhead monorail underslung carrier system comprising a movable overhead transfer bridge or crane adapted to have the rail or rails thereof positioned in end to end relation to the rail or rails of a stationary spur track or a second transfer bridge so that carriers may be transferred directly from one transfer bridge to another in either or both directions and/or from one transfer bridge to a spur track, or vice versa, which system includes means for connecting or interlocking adjoining ends of adjacent transfer bridges or of a transfer bridge and a stationary track when positioned end to end and for aligning or maintaining alignment of the carrier rails both vertically and horizontally under all conditions of load, etc.

Still another object of the invention is the provision of a novel and improved material handling system including interlocking means of the character referred to for connecting transfer bridges to each other or to fixed tracks, which interlocking means will be simple and rugged in construction, reliable in operations, inexpensive to build, and which will maintain the proper clearance between the adjoining ends of the adjacent carrier rails.

The invention resides in certain details of construction and combinations and arrangements of parts and further objects and advantages thereof will be apparent to those skilled in the art to which the invention relates from the following description of the preferred embodiment described with reference to the accompanying drawings forming a part of this specification, in which similar reference characters designate corresponding parts, and in which:

Fig. 1 is a view approximately on the line 1—1 of Fig. 2 showing a portion of a material handling overhead monorail underslung carrier system embodying the present invention;

Fig. 2 is a plan view approximately on the line 2—2 of Fig. 1 of a portion of the material handling system shown in Fig. 1;

Fig. 3 is an enlarged perspective view of the adjoining ends of adjacent transfer bridges shown in Figs. 1 and 2 with the trolley conductor bars, etc., omitted for clearness; and Fig. 4 is a sectional view of portions of the device shown in Fig. 3, taken directly underneath the horizontal flanges of the load supporting girders.

While the present invention is susceptible of various modifications and alternative constructions, it is herein illustrated and described as embodied in a material handling overhead monorail underslung carrier system of the type manufactured by my assignee and known commercially as "Cleveland Tramrail." For the most part, the material handling system herein referred to is well known in the art and only those parts which are necessary to a complete understanding of the present invention are herein illustrated and described in detail.

Referring to the drawings, Fig. 1 is a view of a portion of an electrified material handling overhead monorail underslung carrier system showing a motor-driven overhead transfer bridge designated generally by the reference character A, and a portion of a second transfer bridge B similar to the transfer bridge A. The transfer bridges A and B are shown in side elevation and are positioned end to end so that carriers on the system may be moved from one transfer bridge directly to the other. The particular system illustrated is an electrified system; in other words, the carriers employed thereon are motor-driven, and are preferably cab-controlled. However, the invention is not limited to electrified systems or to any particular type of carrier. The transfer bridges A and B are similar in construction except for the interlocking mechanism hereinafter specifically referred to and only transfer bridge A will be described in detail. The corresponding parts of transfer bridge B, except for the interlocking and safety fork or stop mechanism, will be designated by the same reference characters with a prime mark affixed thereto.

The transfer bridge A comprises a track assembly including girder 10 of T-section, to the lower part of which is welded a carrier rail 11 of inverted T-section, which rail forms the lower or tension member of the girder. The ends of the girder are suspended from end trucks 12 and 13 by being bolted or otherwise secured to the load bars thereof. The end trucks comprise wheels 16 rotatably supported by antifriction bearings in swiveling wheel yokes connected to opposite ends of the load bars of the end trucks. The wheels 16 engage both sides of the rails 17 and 18 suspended from an overhead structure in a suitable manner and which form runways for the transfer bridge A. The particular manner in which the runways are supported forms no part of the present invention. Suffice it to say that the runways are preferably flexibly suspended as by hanger rods 19 to assist in relieving stresses, wheel flange friction, etc.

As is well understood in the art, the carrier rail of the transfer bridge A is adapted to be selectively aligned with one of a plurality of stationary or fixed carrier rails so that carriers on one of such stationary carrier rails or track assemblies may be moved onto the carrier rail of the transfer bridge; thereafter the transfer bridge is aligned with another stationary carrier rail of the system and the carrier transferred thereto. An end portion of one of such stationary carrier rails or spur track assemblies is shown at the right-hand end of Fig. 1 of the drawings and designated generally by the reference character C. The rail proper 20, as shown, is connected to the lower end of a girder 21 which in turn is connected to an overhead support as by a hanger rod 22. As previously stated, the stationary carrier rail or spur track C shown is only one of a plurality of similar rails or spur tracks with which the transfer bridge A is adapted to cooperate. It is also to be understood that the left-hand end of the carrier bridge B is adapted to cooperate with a plurality of similar stationary carrier rails or spur tracks. However, neither the left-hand end of the transfer bridge B nor any of the stationary carrier rails or spur tracks with which it cooperates is shown on the drawings as the construction is similar to that shown at the right-hand end of Fig. 1, and further showing does not appear necessary to a complete understanding of the present invention. If desired, the stationary carrier rails or spur tracks with which the transfer bridges A and B cooperate may be located at either or both sides of the runways for the transfer bridges, depending upon the requirements of any particular system. However, according to the provisions of the present invention, the runways for the respective transfer bridges A and B are so arranged that the transfer bridges can be positioned end to end with their respective carrier rails forming a substantially continuous track, thus permitting carriers to be transferred directly from one transfer bridge to the other, and in this manner from one part of the stationary track system to another part thereof.

The adjoining ends of the track assemblies of the transfer bridges A and B are provided with mechanism for connecting or interlocking them together when the bridges are in end to end position so as to assure the proper alignment of the carrier rails 11 and 11' both horizontally and vertically, and the proper operation of the safety stops, regardless of the load condition on the bridges, thus facilitating the movement of a carrier from one bridge to the other. Preferably, the construction is such that when the transfer bridges are connected together or interlocked, proper clearance is maintained between adjoining ends of adjacent carrier rails. As shown, the transfer bridges may be moved as a unit when connected or interlocked together.

In the embodiment shown, vertical alignment of the rails 11 and 11' is obtained by the engagement of a roller 24 forming a part of the right-hand end of the track assembly of the transfer bridge B in an aperture designated generally by the reference character D in the adjoining end of the track assembly of the transfer bridge A. The roller is rotatably carried by a shaft secured to a block 25 fixed in a bracket 26 welded to the upper surface of the girder 10', and in the embodiment shown the aperture D forms a trackway for the roller 24 defined by upper and lower members 27 and 28 welded to a bracket 29 and to the top of the girder 10 respectively. The members 27 and 28 project to either side of the top of the girder 10 and are bent as shown in the drawings in such a manner that the surfaces engaged by the roller 24 converge with respect to a horizontal plane towards the longitudinal center line of the transfer bridge. Comparatively short flat surfaces are provided midway between the ends of the members 27 and 28. However, this is a matter of choice. The lower member 28 has upwardly projecting flanges 30 along both sides which converge with respect to a vertical plane towards the center line of the transfer bridge, thus providing means for moving the ends of the transfer bridges and in turn the rails 11, 11' together or apart, as the case might be, if they are not properly spaced as the transfer bridges are moved end to end and thereafter maintaining the proper clearance.

The construction just described is such that if either of the transfer bridges is heavily loaded with respect to the other and the rail thereof lower than the rail of the other bridge, the rails 11 and 11' will be properly aligned vertically as the bridges are moved into end to end position by the engagement of the roller 24 with the under surface of the member 27 or the top surface of the member 28. The particular surface engaged by the roller 24 will depend upon which of the bridges is carrying the heavier load. For example, if the bridge A is loaded heavier than the bridge B, the roller 24 will engage with the under surface of the member 27 and vice versa. If the bridges are properly aligned vertically before being moved into end to end position, the roller 24 and the trackway with which it cooperates will maintain proper alignment of the carrier rails regardless of changes in the load condition existing on the transfer bridges. If the transfer bridges can be aligned from one direction only, the ends of the members 27 and 28 not employed can be eliminated and stops provided for the wheel 24 to assist in aligning the bridges horizontally.

The transfer bridges are aligned horizontally and securely connected together so that they may be moved as a unit, in the embodiment shown, by a latch 31 fixed to the right-hand end of slide rods 32 located on opposite sides of the girder 10' and slidably supported in guides 33 bolted to the girder. The left-hand ends of the slide rods 32 are connected to a slide rod yoke 34 slidably supported on the top of the girder 10' and adapted to be reciprocated by a suitable mechanism, such as the reversible electric motor 35, connected thereto through the medium of a crank mechanism 36. The construction of the motor and crank mechanism forms no part of the present invention and will not be described in detail. Suffice it to say that as the motor 35 is operated in opposite directions, the slide rods 32 are moved back and forth depending upon the direction in which the motor is operating. The motor 35 may be controlled from any suitable location. Since the system shown herein is an electrified system and the preferred type of carriers are cab-controlled, the construction is preferably such that the motor can be operated from the carrier cabs. If desired, the latch 31 may be normally held in its extended position by a spring, in which event the motor 35 is merely employed to withdraw the latch when desired, and tapered surfaces 23 on the latch 31 retract the same by their engagement with the web of the girder 10 as the bridges are moved into end to end position.

The latch 31 which forms a part of the track assembly of the transfer bridge B is provided with a vertical slot 37 opening into its right-hand end. The open end of the slot is preferably formed by surfaces 38, 39 which converge towards the rear of the slot with respect to a vertical plane. The construction is such that as the latch 31 is moved towards the right, as viewed in the drawings, by actuation of the motor 35 in the proper direction, the left-hand end portion of the vertical flange of the girder 10 engages within the slot 37 and is securely held therein. If the transfer bridges are not in exact alignment, the converging side walls 38, 39 of the latch 31 align them horizontally as the girder 10 is engaged within the slot 37. The tapered surfaces 23 on the latch 31 engage the web of the girder 10 if the transfer bridges are moved into end to end position with the latch extended and retract the latch, thus avoiding damage to the system.

The adjoining ends of the transfer bridges referred to above are provided with pairs of safety members or forks 40 and 41 located on opposite sides of the girders 10 and 10', respectively, and adapted to engage the supporting wheels of carriers on the respective bridges A and B at all times except when the horizontal interlock mechanism or latch 31 is connecting the bridges together and maintaining the adjoining end of the carrier rails in proper vertical and horizontal alignment, thus preventing the accidental movement of carriers off the ends of the bridges. The safety forks 40 are pivotally connected to the girder 10 by brackets 42 and are provided with curved surfaces 43 engaged by the forward vertical wall of the latch 31 as it is moved into forward or locking position to swing the safety forks out of operative position. The safety forks 41 are pivotally connected to the latch 31 by a pin 44 and are provided with curved surfaces 45 adapted to engage a curved surface 46 on a member 47 welded to the left-hand end of the girder 10 and be raised thereby when the latch 31 is moved into its engaged position with the girder 10. The construction is such that as the latch 31 is moved forward under the action of the motor 35, the safety forks 40 and 41 are raised into inoperative position, thus permitting free movement of a carrier from one bridge to the other.

The same interlocking, aligning, and safety mechanism employed to interlock and align the transfer bridges A and B is employed to connect the transfer bridges to the fixed spur tracks with which the respective transfer bridges are adapted to cooperate as shown at the right-hand end of Fig. 1 where the corresponding parts are designated by the same reference characters with a prime mark affixed thereto.

From the foregoing description of the preferred embodiment of the invention, it will be apparent that the objects hereinbefore enumerated and others have been accomplished and that there has been provided a new and improved overhead monorail underslung carrier system including novel means for connecting and aligning the rails of movable tracks of the system with each other or with fixed tracks. While the preferred embodiment of the invention has been described in considerable detail, I do not wish to be limited to the particular construction shown, which may be varied within the scope of this invention, and it is the intention to hereby cover all adaptations, modifications and arrangements thereof which come within the practice of those skilled in the art to which the invention relates.

Having thus described my invention, I claim:

In an overhead underslung carrier system, the combination of: an overhead underslung carrier track assembly including a carrier supporting rail; a generally horizontal runway at one end of said track assembly; a second underslung carrier track assembly including a second carrier supporting rail; means for supporting said second track assembly for movement along said runway; means for selectively moving said second track assembly along said runway whereby said rails may be moved into and out of end to end position with respect to each other; one of said track assemblies comprising a guideway extending lengthwise of said runway and comprising upper and lower horizontal guide surfaces terminating in portions inclined with respect to a horizontal plane and side vertical guide surfaces terminating in portions inclined with respect to a vertical plane and the other of said track assemblies comprising a roller adapted to engage in said guideway as said rails are moved into end to end position and vertically align the ends thereof and position them in predetermined spaced relation; one of said track assemblies having a vertical slot at least a portion of the sides of which are inclined with respect to a vertical plane and the other of said track assemblies comprising a member adapted to be engaged within said slot; means for engaging said member within said slot whereby said vertically aligned rail ends are horizontally aligned and fixedly maintained in said alignment; means for disengaging said member from said slot; each of said track assemblies comprising a safety stop adjacent to the end thereof adapted to adjoin the other track assembly and which safety stop is normally positioned in the path of a carrier supported for movement along said rails; and means on said safety stops cooperating with adjacent parts of the adjoining track assembly upon engagement of said member within said slot for moving said safety stops to inoperative positions.

FREDERICK W. EVERARD.